Oct. 1, 1940.   C. C. FULTON   2,216,313

WEED FENDER OR GUARD FOR MOWING MACHINES AND THE LIKE

Filed Aug. 9, 1939

Inventor:
Claude C. Fulton
By Herbert G. Fletcher
atty.

Patented Oct. 1, 1940

2,216,313

UNITED STATES PATENT OFFICE 2,216,313

WEED FENDER OR GUARD FOR MOWING MACHINES AND THE LIKE

Claude C. Fulton, St. Louis, Mo.

Application August 9, 1939, Serial No. 289,295

6 Claims. (Cl. 56—1)

This invention relates to improvements in fenders or guards for mowing machines and has for one of its objects to provide the fender with means for entraining the cut weeds or the like, in a direction beneath the mower so that the cut material will not become entangled with parts of the mower.

Another object is to provide the fender with improved means for assuring paralleling discharging disposal of relatively tall cut weeds and the like, so that they can be entrained beneath the frame supporting part of the mower.

A further object of the invention is to provide the fender with forwardly disposed means for engaging and leaning relatively tall weeds in advance of being cut by the mower blade or blades, so that the weeds will be directed to fall in a specific direction after being cut.

Another further object of the invention is to provide a mower with means for engaging and staying relatively tall weeds and the like, in a position to assist the mowing operation thereof by the cutter or cutters of the mower.

Other objects and advantages will appear as this description progresses and by reference to the drawing, in which.

Figure 1:
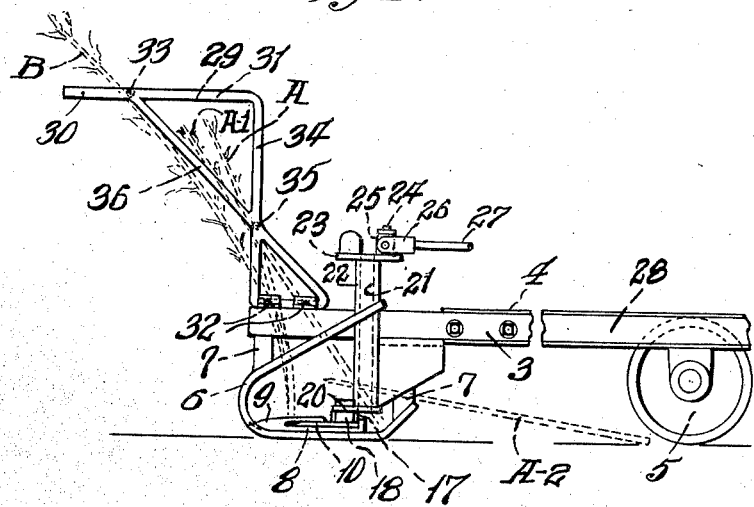
Figure 1 is a side elevation of a part of a mowing machine and having an intermediate portion broken away, and the invention being shown as applied to the forward end thereof.
Figure 2:
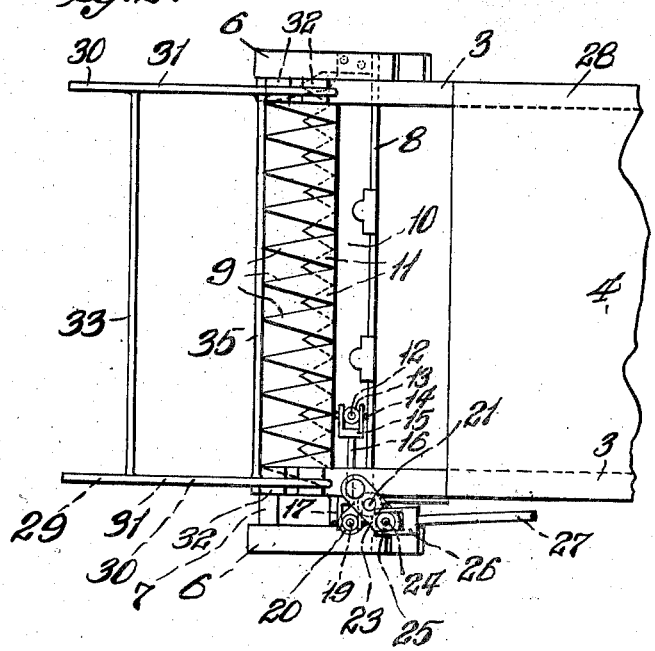
Figure 2 is a plan elevation of the forward part of Figure 1.

Referring by numerals to the accompanying drawing, 3 designates a pair of horizontally disposed and longitudinally extending side members supporting a platform 4 of a mowing machine, the rear end of the mowing machine being supported by the tractor or ground engaging roller 5, and the forward end of the machine being supported by a pair of runners 6.

Each runner 6 is secured to a respective side member 3 by a bracket 7 and supported on said runners a desired distance above the ground, is a cutting blade support 8 which is disposed transversely to the side members 3.

The cutting blade support 8 is provided with the usually spaced forwardly projecting dividing prongs 9 for engaging the weeds or rough vegetation to be cut or mowed, and horizontally mounted on said support 8 is a cutting blade 10 having a plurality of teeth 11 and extending upwardly from the blade 10 adjacent one end is a pin 12 having a bearing block 13 mounted thereon, and secured to said bearing block by pinning 14 is a bifurcated end 15 of a connecting rod 16, the opposite end of said rod having a bifurcated end 17 which is likewise secured to a bearing block 18 which is mounted on a pin 19 of a crank 20.

The crank 20 is secured at one end to a vertical shaft 21 which is supported in a tubular length 22 which extends upwardly in a plane above the platform 4 of the mowing machine, and secured to the upper end of the shaft 21 is a crank 23 having at one end an upwardly extending pin 24 on which a bearing block 25 is mounted, and connected to the bearing block 25 is the bifurcated end 26 of a connecting rod 27, said connecting rod adapted to be connected to an operating mechanism such as the crank of a driving shaft of a motor and the like, not shown, which may be carried on the platform 4 of the mowing machine.

Secured to the forward end of the mowing machine 28 is this improved weed fender 29, said fender comprising a pair of side members 31 each having a forwardly extending horizontal portion 30 and the lower end of each side member being secured on the forwardly extending end of a respective side member 3 of the mowing machine 28 by brackets 32. Connected at each end to respective horizontal portions 30 of the weed fender 29 is a horizontally disposed weed pressing rod 33, and connected at its ends to respective vertically disposed legs 34 of the weed frame 29 is another weed pressing rod 35, the rod 35 however, being disposed in a plane lower and rearwardly of the rod 33 and said rod 35 being disposed forwardly of the teeth 11 of the cutting blade 10, in the manner as shown in both figures of the drawing, for specific purposes hereinafter described.

In the operation of a mowing machine having this improved weed fender or guard attached, before the cutting blades engage the relatively tall growth such as weeds and the like to be cut, either of the presser rods 33 or 35 will first engage the weed stalks dependent on the height of the weed growth, for as shown by dotted lines A in Fig. 1, the weed stalk thus indicated, not being sufficiently tall to reach the presser rod 33 will be engaged by the presser rod 35 and pressed forwardly in a bowed manner, momentarily prior to being engaged and cut off adjacent the ground by the teeth 11 of the cutting blade 10. When the stalk A has been cut, by reason of it being given a forward inclination by the travel of the mowing machine and/or the presser rod 35, it will be forced to fall forwardly, in the manner as shown at A—1, so that the lower end of the cut stalk will be disposed rearwardly and finally inclined to the approximate position shown at A—2, where it can readily be traveled over by the mowing machine without entangling interference.

When the weed stalks are sufficiently tall, such as indicated at B, they may not be engaged by the presser rod 35 but will however, be engaged by the presser rod 33 whereby they will be inclined forwardly in the manner shown in dotted lines, a momentary period of time before being engaged by the teeth 11 of the cutting blade 10, and after cutting the tall weed stalks, will be inclined and disposed in the manner indicated with respect to the weed stalk A, so that there will be no ultimate entangling of the cut weed growth as the mowing machine is traveled thereover. In some instances however, weeds of sufficient height may be engaged by both presser rods 33 and 35 and which double engagement will have the same effect of leaning the tall weeds forwardly before cutting. Obviously, the leaning forward of the heavy growth before cutting, enhances the cutting operation particularly when the weed stalks are relatively thick in diameter, as the inclination given to thick stalks aids the cutting operation by tending to widen the initially started cutting gap made by the cutting blade.

While I have described one embodiment of my invention with some particularity, obviously many other embodiments thereof may occur to those skilled in the art to which it appertains. I, therefore, do not limit myself to the precise details described, but claim as my invention all variations and modifications coming within the scope of the subjoined claims.

The forwardly extending horizontal portions 30 of the side members 31 of the weed fender 29 by reason of them being disposed forwardly of the presser rod 33, will embrace and retain the tall weeds as they are cut and prevent them falling sidewise, and the inclined portions 36 of the fender will likewise retain the shorter stalks from falling to the side of the cut swath.

What I claim is:

1. In combination with a mowing machine, a transverse member disposed forwardly of the cutting blade of the machine in parallelism therewith and in a plane above the blade, and supporting means for said member for securing it to the machine comprising side members each having a part extending forwardly of said transverse member.

2. A mowing machine having cutting means, and a transverse weed pressing member paralleling and disposed in proximity to said cutting means and in a plane thereabove, a second transverse weed pressing member disposed forwardly of said first pressing member and in a different horizontal plane, and a pair of side members supporting the ends of said weed pressing members, each side member having a part extending forwardly of respective weed pressing members.

3. A weed fender comprising a frame having side members, a pair of forwardly disposed transverse members arranged in different horizontal and vertical planes with respect to each other and fixed at their ends to said side members, said side members each having a portion which extends forwardly of said transverse members.

4. A weed fender comprising a frame having a pair of forwardly disposed transverse members arranged in different horizontal and vertical planes with respect to each other, the lowermost one of said members being disposed rearwardly of the other member, and said frame having side portions extending forwardly of said transverse members.

5. A mowing machine comprising side members, a runner supported from each side member, a cutting blade carried by said runners, and a frame extended from said side members having a transverse weed pressing rod paralleling the cutting blade and being disposed in proximity thereto and in a plane thereabove, said frame having side portions extending forwardly of said weed pressing rod.

6. A weed fender for a mowing machine comprising a frame having a pair of forwardly extending side members, and a pair of transverse members joined at their ends with said side members, said transverse members being arranged in different horizontal and vertical planes, and disposed rearwardly of the extending ends of said side members.

CLAUDE C. FULTON.